United States Patent
Weidmann

(10) Patent No.: US 10,920,019 B2
(45) Date of Patent: Feb. 16, 2021

(54) PREPARATION OF POLY AMIDOIMIDES

(71) Applicant: Huntsman International LLC, The Woodlands, TX (US)

(72) Inventor: Ulrich Weidmann, Basel (CH)

(73) Assignee: HUNTSMAN INTERNATIONAL LLC, The Woodlands, TX (US)

(*) Notice: Subject to any disclaimer, the term of this patent is extended or adjusted under 35 U.S.C. 154(b) by 400 days.

(21) Appl. No.: 15/762,979

(22) PCT Filed: Sep. 2, 2016

(86) PCT No.: PCT/EP2016/070751
§ 371 (c)(1),
(2) Date: Mar. 23, 2018

(87) PCT Pub. No.: WO2017/050541
PCT Pub. Date: Mar. 30, 2017

(65) Prior Publication Data
US 2020/0239638 A1    Jul. 30, 2020

(30) Foreign Application Priority Data

Sep. 25, 2015 (EP) .................................... 15186805

(51) Int. Cl.
| C08G 73/14 | (2006.01) |
| C08G 73/10 | (2006.01) |
| C09D 179/08 | (2006.01) |
| C08L 79/08 | (2006.01) |

(52) U.S. Cl.
CPC ......... *C08G 73/14* (2013.01); *C08G 73/1035* (2013.01); *C08G 73/1067* (2013.01); *C08L 79/08* (2013.01); *C09D 179/08* (2013.01)

(58) Field of Classification Search
CPC ....... C08L 79/08; C08G 73/14; C09D 179/08; C09J 179/08
See application file for complete search history.

(56) References Cited

U.S. PATENT DOCUMENTS

| 3,790,530 A | 2/1974 | Koerner et al. |
| 3,884,880 A | 5/1975 | Disque et al. |
| 4,448,844 A | 5/1984 | Osada et al. |
| 4,497,944 A | 2/1985 | Nishizawa et al. |
| 4,740,576 A | 4/1988 | Reiter et al. |
| 4,927,900 A | 5/1990 | Michaud et al. |
| 2012/0222889 A1* | 9/2012 | Davis ............... C09J 179/08 174/254 |
| 2016/0002408 A1* | 1/2016 | Sidenstick ......... C08G 73/1003 528/49 |

FOREIGN PATENT DOCUMENTS

| CN | 1078569 A | 11/1993 |
| DE | 3240934 | 6/1983 |
| DE | 3249544 | 7/1985 |
| DE | 68905059 | 6/1993 |
| EP | 0543409 B1 | 7/1996 |
| EP | 2791208 B1 | 6/2017 |
| JP | 5880326 B2 | 3/2016 |
| JP | 2018513656 A | 5/2018 |
| WO | 2011000030 | 1/2011 |
| WO | 2011051412 | 5/2011 |
| WO | 2014096075 | 6/2014 |

OTHER PUBLICATIONS

Duereh et al "Replacement of Hazardous Chemicals Used in Engineering Plastics with Safe and Renewable Hydrogen-Bond Donor and Acceptor Solvent-Pair Mixtures", ACS Sustainable Chem. Eng. 2015, 3, 1881-1889, published on Jul. 8, 2015.*
PCT International Search Report and the Written Opinion of the International Searching Authority dated Nov. 3, 2016, for patent application PCT/EP2016070751, filed Sep. 2, 2016, 10 pages.
James Sherwood et al., "Dihydrolevoglucosenone (Cyrene) as a Bio-Based Alternative for Dipolar Aprotic Solvents", ChemComm, Journal of the Royal Society of Chemistry 2014, 50, pp. 9650-9652.

* cited by examiner

*Primary Examiner* — Gregory Listvoyb
(74) *Attorney, Agent, or Firm* — Huntsman International LLC; Lewis D. Craft

(57) ABSTRACT

A liquid composition comprising
(a) a solvent or solvent mixture containing at least 50% by weight, based on the total amount of solvents, of a dioxabicycloalkane derivative,
(b) an aromatic tricarboxylic acid anhydride, and
(c) an aromatic diisocyanate,
can be used as coating composition for metal surfaces.

14 Claims, No Drawings

PREPARATION OF POLYAMIDOIMIDES

CROSS-REFERENCE TO RELATED APPLICATIONS

This application is the National Phase of International Application PCT/EP2016/070751 filed Sep. 2, 2016 which designated the U.S. and which claims priority to European App. No. 15186805.6 filed Sep. 25, 2015. The noted applications are incorporated herein by reference.

FIELD OF INVENTION

The present invention relates to a liquid composition comprising a specific solvent or solvent mixture, an aromatic acid anhydride and an aromatic diisocyanate, a polyamidoimide prepared from this composition and the use of this polyamidoimide as coating material for metal surfaces.

BACKGROUND OF THE INVENTION

It has long been known to prepare polyaminoimides (PAIS) from tricarboxylic acid monoanhydrides and diisocyanates in polar aprotic solvents like N-methylpyrrolidone (NMP). NMP, however, has recently been reclassified as toxic to reproduction and development and listed as having specific organ toxicity to the respiratory tract.

Furthermore, curing times of coatings prepared from PAIS in NMP in many cases turned out to be too long and solvent resistance too low for certain applications.

Accordingly, there is a need for thermostable and solvent resistant PAI coatings which can be prepared quickly and substantially without using hazardous solvents mixtures.

It has now unexpectedly been found that the use of a dioxabicycloalkane derivative as solvent solves the abovementioned problems to a great extent.

DETAILED DESCRIPTION

Accordingly, the invention relates to a liquid composition comprising
(a) a solvent or solvent mixture containing at least 50% by weight, based on the total amount of solvents, of a dioxabicycloalkane derivative,
(b) an aromatic tricarboxylic acid anhydride, and
(c) an aromatic diisocyanate.

Liquid compounds derived from dioxabicycloalkanes possess outstanding solvent properties with respect to PAIs. These solvents can be produced from renewable resources like wood or other cellulose-containing products and are usually biodegradable.

Suitable dioxabicycloalkane derivatives are dioxabicyclo[3.2.1]octane, dioxabicyclo[2.2.2]octane, dioxabicyclo[3.3.2]decane, dioxabicyclo[4.2.2]decane, dioxabicyclo[4.3.1]decane, dioxabicyclo[5.2.1]decane, dioxabicyclo[3.3.3]undecane, dioxabicyclo[4.3.2]undecane, dioxabicyclo[4.4.1]undecane and dioxabicyclo[5.3.1]undecane as well as liquid derivatives thereof, in particular their keto derivatives.

Preferably, the solvent according to component (a) is a derivative of 2,8-dioxabicyclo[3.2.1]octane or 6,8-dioxabicyclo[3.2.1]octane.

Such compounds are natural products, like zaragozic acid A or sordidin, or can be prepared according to known methods. Suitable 2,8-dioxabicyclo[3.2.1]octane derivatives are described, for example, in J. Am. Chem. Soc. 117, 8106-8125 (1995).

Examples for suitable solvents are 2,8-dioxabicyclo[3.2.1]octane, 2,8-dioxabicyclo[3.2.1]octan-4-one, 2,8-dioxabicyclo[3.2.1]octan-4-thione, 4-methylidene-2,8-dioxabicyclo[3.2.1]octane, 1-methyl-2,8-dioxabicyclo[3.2.1]octan-7-one, 1,4,4-trimethyl-2,8-dioxabicyclo[3.2.1]octan-7-one, 1,3,5-trimethyl-2,8-dioxabicyclo[3.2.1]octan-7-one, 1-methyl-4-phenyl-2,8-dioxabicyclo[3.2.1]octan-7-one, 1-methyl-4-phenyl-2,8-dioxabicyclo[3.2.1]oct-7-yl acetate, 6,8-dioxabicyclo[3.2.1]octane, 6,8-dioxabicyclo[3.2.1]octan-4-thione and 6,8-dioxabicyclo[3.2.1]octan-4-one.

Particularly preferred as component (a) is 6,8-dioxabicyclo[3.2.1]octan-4-one.

Dihydrolevoglucosenone (6,8-dioxabicyclo[3.2.1]octan-4-one) is a dipolar aprotic solvent manufactured from renewable cellulose and has been tested for potential mutagenicity with no mutagenicity observed.

In the meantime 6,8-dioxabicyclo[3.2.1]octan-4-one is commercially available under the designation Cyrene™ (supplied by Circa Group).

It has surprisingly been found that the application of dioxabicycloalkane derivatives instead of conventional polar aprotic solvents like NMP as solvent for the polycondensation of carboxylic acid anhydrides and diisocyanates not only facilitates rapid curing but also provides coatings having enhanced solvent resistance.

The solvent mixture used in the claimed composition may contain up to 50% by weight of other polar aprotic solvents like, for example, acetone, cyclohexanone, tetramethylurea, nitromethane, ethylene sulphite, N,N-dimethylacetamide (DMAC), N,N-dimethylformamide (DMF), N,N'-dimethylethylene urea, 3-methyloxazolidin-2-one, acetonitrile, dimethyl sulfoxide (DMSO), N,N'-dimethylpropylene urea (DMPU), N-methyl-ε-caprolactam, dimethyl sulfone, S,S-dimethyl sulfoximine, tetraethylsulfamide, sulfolane, ethylene carbonate, dioxane, dioxolane, methylphosphonic acid bis(dimethylamide), propylene carbonate, hexamethylphosphoric acid triamide (HMPT), ε-caprolactone, δ-valerolactone, γ-valerolactone, limonene, 5-(dimethylamino)-2-methyl-5-oxopentanoic acid methyl ester, pentatiedioic acid, 2-methyl-1,5-dimethyl ester, 3-methoxypropionyl-N,N-dimethylamide and 3-butoxypropionyl-N,N-dimethylamide, In a preferred embodiment the composition according to the invention comprises as component (a) a solvent or solvent mixture containing 90-100% by weight of a dioxabicycloalkane derivative.

It is important that the water content of the used solvents is as low as possible.

A smooth reaction takes place when the water content of the solvents is <0.1% by weight.

Especially preferred are compositions comprising as component (a) pure dioxabicycloalkane derivative, in particular pure 6,8-dioxabicyclo[3.2.1]octan-4-one.

Suitable starting products for the preparation of polyamidoimides, i.e. components (b) and (c) are well known and either commercially available or can be synthesised according to known methods.

Examples for aromatic tricarboxylic acid anhydrides as component (b) are trimellitic acid anhydride (TMA), hemimellitic acid anhydride, methyltrimellitic acid anhydride, 4'-carboxydiphenyl-3,4-dicarboxylic acid anhydride, 1,2,3-benzenetricarboxylic acid anhydride, 3,4,6- and 1,3,8- naphthalenetricarboxylic acid anhydride, 1,2,7-anthracenetricarboxylic acid anhydride and combinations thereof.

Trimellitic acid anhydride is particularly preferred.

Suitable diisocyanates as component (c) are, for example, 2,4-toluenediisocyanate, 2,5-toluenediisocyanate, 2,6-toluenediisocyanate, 3,5-toluenediisocyanate, 1-methoxy-2,4-phenylenediisocyanate, 1,3,5-triethyl-2,4-phenylenediisocyanate, 1-methyl-3,5-diethyl-6-chloro-2,4-phenylenediisocyanate, p-xylylenediisocyanate, m-xylylenediisocyanate, benzophenone-4,4'-diisocyanate, 1,4-naphthylenediisocyanate, 1,5-naphthylenediisocyanate, 4,4-diisocyanatodiphenylmethane, 4,4-diisocyanato-3,3'-dimethyldiphenylmethane, 2,2'-diisocyanato-4,4'-dimethyldiphenylmethane, 4-methoxy-1,3-phenylenediisocyanate, 4,4-diisocyanato-3,3'-dichlorodiphenylmethane, 4,4-diisocyanatodiphenylether, 2,4-diisocyanatodiphenylether, 1,3-phenylenediisocyanate, 3,3'-dimethoxy-4,4'-biphenylenediisocyanate, 3,3'-diethoxy-4,4'-biphenylenediisocyanate, 4-chloro-1,3-phenylenediisocyanate, 4,4'-biphenylenediisocyanate, 3,3'-dimethyl-4,4'-biphenylenediisocyanate, 1-methyl-3,5-diethyl-2,4-phenylenediisocyanate, 4-iisopropyl-1,3-phenylenediisocyanate, durylenediisocyanate, 3,3'-bitolylene-4,4'-diisocyanate, 1-methyl-3,5-diethyl-2,6-phenylenediisocyanate, 2,2-bis(4-isocyanatophenyl)propane and 4,6-dimethyl-1,3-xylylenediisocyanate and combinations thereof.

Preferably component (c) is 4,4'-diisocyanatodiphenylmethane.

Components (b) and (c) are conveniently applied in approximately equimolar amounts. Approximately equimolar amounts in this context means that 0.7-1.3 mol, preferably 0.8°-°1.2 mol, in particular 0.9-1.1 mol, of tricarboxylic acid is applied per 1 mol of diisocyanate.

The relative amounts of components (a), (b) and (c) may vary within wide ranges.

In a preferred embodiment the amount of component (a) is 60-95% by weight, more preferably 70-90% by weight and in particular 75-85% by weight, based on the total composition, and the total amount of components (b)+(c) is 5-40% by weight, more preferably 10-30% by weight and in particular 15-25% by weight, based on the total composition.

Components (b) and (c) are successively dissolved in the solvent or solvent mixture according to component (a), if required at elevated temperature, for example at 50-150° C., preferably at 60-100° C. Subsequently, the reaction is carried out under stirring at high temperature, preferably at 110-180° C., more preferably at 120-160° C. During the polycondensation reaction the viscosity of the solution is determined from time to time.

For coating applications a viscosity of 2000 mPa·s-6000 mPa·s, preferably 3000 mPa·s-5000 mPa·s (determined according to ISO 3219 at 25° C. using a CAP 2000 viscosimeter (Brookfield) with cone 6) is advisable. When the desired viscosity is achieved, the reaction can be quenched by addition of an isocyanate blocking agent.

Suitable isocyanate blocking agent are described, for instance, in WO 2011/051412. Typical isocyanate blocking agents include alcohols, such as phenols and polyols; amines; amides, such as lactams; active methylene compounds with a labile methylene proton, such as malonates; nitrogen-containing hetroaryl compounds, such as pyrazoles; oximes; ketoximes, such as dialkyl ketoximes; and hydroxamic acid esters.

Example for suitable isocyanate blocking agents are diethyl malonate, 3,5-dimethylpyrazole, methylethylketoxime and, preferably, ε-caprolactame.

If desired, the liquid composition according to the invention may contain customary additives, like stabilizers, extenders, fillers, reinforcing agents, pigments, dyestuffs, plasticizers, tackifiers, rubbers, accelerators, diluents or any mixture thereof.

The invention therefore further relates to a process for the preparation of a solution of an aromatic polyamidoimide characterised in that a composition according to claim 1 is heated to 50° C.-230° C. until the viscosity of the solution is 3000 mPa·s-5000 mPa·s and the polymerisation reaction is quenched by addition of an isocyanate blocking agent.

A further embodiment of the invention is the polyaminoimide prepared by the process described above.

In solution form the PAIS so obtained are well suited for the manufacture of fibres, insulating varnishes, adhesives and, in particular, coating films.

The PAI solution curing agent may be applied to one or more surfaces of a substrate at a desired thickness by methods well known to those skilled in the art, such as, spraying, dipping, brushing, painting, roller coating, etc. After application, the coating is cured at ambient conditions and/or by the application of heat. The substrate may be, but is not limited to, cement, metal, concrete, brick, cement board or sheetrock.

Preferably, the solution of an aromatic polyamidoimide obtained by the above-described process is used as coating composition for metal surfaces. In particular for aluminium and steel surfaces.

The invention therefore further relates to a method of forming a cured coating on a substrate comprising applying the solution of an aromatic polyamidoimide prepared according to the above-described process onto a substrate to form a coating and subjecting the coating to curing conditions.

The applied coating may be allowed to cure for any period of time sufficient to allow the coating to harden, such as, for example from 1 minute to about 10 days. Elevated temperatures normally accelerate the curing reaction, for example 2 h/80° C.+1 h/120° C.+2 h/220° C. in general is sufficient.

The coatings obtained from the compositions according to the invention can be cured in a very short time by heating to temperatures >200° C. Usually, a complete curing is achieved within 3 min at 230° C.

The cured coatings are distinguished by excellent thermostability and solvent resistance, in particular solvent resistance with respect to NMP.

Thus, in yet another embodiment there is provided an article or substrate coated according to the method described above.

The invention is illustrated by the following non-limiting examples.

EXAMPLES

Measurement of Properties and List of Used Raw Materials:

Unless otherwise indicated, the viscosity of the solutions is determined at 25° C. using a CAP 2000 viscosimeter (Brookfield) with cone 6 (ISO 3219).

The solvents used in the examples are commercially available products.

CYRENE™ is 6,8-dioxabicyclo[3.2.1]octan-4-one (dihydrolevoglucosenone, supplied by Cerca Group).

4,4'-Diisocyanatodiphenylmethane (MDI) and trimellitic acid anhydride (TMA) are likewise commercially available products of purity >95%.

Example A1

79.8 g of Cyrene are placed in a glass reactor equipped with KPG-stirrer (propeller), thermocouple, gas tight stirrer tube, temperature controlling device, reflux condenser and nitrogen inlet. 8.41 g (0.0438 mol) of trimellitic acid anhydride (TMA) are added under stirring at 155 rpm. The mixture is heated whereupon the TMA is solved at 65° C. At an internal temperature of 89° C., 10.97 g (0.0438 mol) of 4,4'-diisocyanatodiphenylmethane (MDI) is added. At 85° C. the MDI begins to solve. The internal temperature in the flask is increased to 145° C. and kept for one hour. At 136° C. a distinct gas evolution is observed. At 145° C. the reaction viscosity is determined. After a reaction time of five hours at 145° C. the viscosity is 3540 mPa·s (Cone 6, 500 rpm. CAP 2000, Brookfield). The content of the flask is cooled down to an internal temperature of 100° C. and 0.83 g ε-caprolactame is added. The black liquid is kept for further 3 hours at 100° C. After that time the solution is cooled down to room temperature.

Yield: 83.65 g, $\eta_{25°\,C.}$=3345 mPa·s, Cone 6, 500 rpm (CAP 2000, Brookfield).

Examples A2 and A3 and Comparative Example C1

As described above in Example A1, solutions of polyamidoimides are prepared from TMA and MDI using a mixture of Cyrene and sulfolane (Example A2), a mixture of Cyrene and N-methylpyrrolidone (NMP) (Example A3) and pure NMP (Comparative Example C2).

Solvent Resistance Tests

A. Resistance to NMP Under Load

The solutions prepared in Examples A1-A3 and C1 are applied to aluminium sheets and the coatings are cured in an oven (3 min/230° C.). Subsequently, the coated sheets are immersed in NMP under load (2 kg/3 h or 2 kg/6 h, respectively) at room temperature (RT).

The appearance of the coatings is evaluated visually.

B. Resistance to NMP—24 h Test

The solutions prepared in Examples A1-A3 and C1 are applied to steel sheets and the coatings are cured in an oven (2 h/80° C., 1 h/120° C., 2 h/220° C.). Subsequently, the coated sheets are immersed in NMP for 24 h at RT. The appearance of the coatings is evaluated visually according to the following grades:

+=passed
/=borderline
=failed

The results of the tests are summarised in Table 1.

TABLE 1

The amounts of the ingredients of Compositions A1, A2, A3 and C1 are given in parts by weight

| Composition | A1 | A2 | A3 | C1 |
|---|---|---|---|---|
| Cyrene | 79.8 | 31.32 | 31.32 | |
| Sulfolane | | 18.68 | | |
| Cyclohexanone | | | 18.68 | |
| NMP | | | | 159.6 |
| MDI | 10.97 | 6.88 | 6.88 | 21.94 |
| TMA | 8.41 | 5.27 | 5.27 | 16.82 |
| NMP Test | | | | |
| 3 h under load | + | + | + | − |
| 6 h under load after 24 h in NMP | + | − | − | − |
| layer thickness (wet) 100 μm | + | + | + | − |
| layer thickness (wet) 200 μm | + | + | + | / |
| layer thickness (wet) 300 μm | + | + | + | + |

Discussion of Test Results

The inventive compositions A1, A2 and A3 provide cured products that fulfill the requirements of heat-resistant coatings for aluminium and steel surfaces.

Surprisingly, a film prepared on a metal plate from a composition according to the invention can be cured at 230° C. within 3 min and the cured coating remains stable in NMP at RT and in NMP under load.

On the other hand, the coatings obtained from Comparative Composition C1 do not match the requirements with respect to solvent resistance.

What is claimed is:

1. A liquid composition comprising
   (a) a solvent or solvent mixture containing at least 50% by weight, based on the total amount of solvents, of a dioxabicycloalkane derivative,
   (b) an aromatic tricarboxylic acid anhydride, and
   (c) an aromatic diisocyanate.

2. A composition according to claim 1 comprising as component (a) a derivative of 2,8-dioxabicyclo[3.2.1]octane or 6,8-dioxabicyclo[3.2.1]octane.

3. A composition according to claim 1 comprising as component (a) 6,8-dioxabicyclo[3.2.1]octan-4-one.

4. A composition according to claim 1 comprising as component (a) a solvent or solvent mixture containing 90-100% by weight of a dioxabicycloalkane derivative.

5. A composition according to claim 1 containing as component (b) trimellitic acid anhydride.

6. A composition according to claim 1 containing as component (c) 4,4'-diisocyanatodiphenylmethane.

7. A composition according to claim 1 wherein the amount of component (a) is 60-95% by weight, based on the total composition, and the total amount of components (b)+(c) is 5-40% by weight, based on the total composition.

8. A composition according to claim 2 containing as component (b) trimellitic acid anhydride.

9. A composition according to claim 3 containing as component (b) trimellitic acid anhydride.

10. A composition according to claim 4 containing as component (b) trimellitic acid anhydride.

11. A composition according to claim 2 containing as component (c) 4,4'-diisocyanatodiphenylmethane.

12. A composition according to claim 3 containing as component (c) 4,4'-diisocyanatodiphenylmethane.

13. A composition according to claim 4 containing as component (c) 4,4'-diisocyanatodiphenylmethane.

14. A composition according to claim 5 containing as component (c) 4,4'-diisocyanatodiphenylmethane.

* * * * *